(12) United States Patent
Raptis et al.

(10) Patent No.: US 8,374,012 B2
(45) Date of Patent: Feb. 12, 2013

(54) PHASE-CONTROLLED UNINTERRUPTIBLE POWER SUPPLY

(75) Inventors: Mark Raptis, Valley Center, CA (US); Jeff Gray, San Diego, CA (US); Dugan Joyce, Chula Vista, CA (US); Albert Dibelka, La Mesa, CA (US); Alex Mueggenborg, Arlington, VA (US)

(73) Assignee: CareFusion 303, Inc., San Diego, CA (US)

( * ) Notice: Subject to any disclaimer, the term of this patent is extended or adjusted under 35 U.S.C. 154(b) by 331 days.

(21) Appl. No.: 12/813,327

(22) Filed: Jun. 10, 2010

(65) Prior Publication Data
US 2011/0305049 A1    Dec. 15, 2011

(51) Int. Cl.
*H02M 3/335* (2006.01)
*H02M 7/538* (2007.01)

(52) U.S. Cl. ......... 363/133; 363/20; 363/21.01; 363/24; 363/25; 363/132; 363/134; 363/97; 363/98; 307/23; 307/64; 307/66; 307/69

(58) Field of Classification Search ............. 363/20, 363/21.01, 24, 25, 132, 133, 134, 97, 98; 307/23, 64, 66, 69
See application file for complete search history.

(56) References Cited

U.S. PATENT DOCUMENTS

| | | | | |
|---|---|---|---|---|
| 4,066,938 A | * | 1/1978 | Turnbull | 318/803 |
| 4,465,943 A | * | 8/1984 | Risberg | 307/67 |
| 4,709,318 A | * | 11/1987 | Gephart et al. | 363/37 |
| 5,121,314 A | | 6/1992 | Cathell et al. | |
| 5,684,686 A | | 11/1997 | Reddy | |
| 5,774,351 A | * | 6/1998 | Hsieh et al. | 363/132 |
| 6,100,672 A | * | 8/2000 | Siponen | 320/150 |
| 6,157,168 A | | 12/2000 | Malik | |
| 6,504,270 B1 | | 1/2003 | Matsushita | |
| 7,034,412 B2 | * | 4/2006 | Kuribayashi | 307/9.1 |
| 7,864,552 B2 | * | 1/2011 | Heber et al. | 363/52 |
| 2005/0001582 A1 | * | 1/2005 | Goto et al. | 318/802 |
| 2006/0238031 A1 | | 10/2006 | Frey | |

OTHER PUBLICATIONS

International Search Report and Written Opinion for PCT/US2011/030086 mailed Oct. 27, 2011.

* cited by examiner

*Primary Examiner* — Bao Q Vu
(74) *Attorney, Agent, or Firm* — McDermott Will & Emery LLP

(57) ABSTRACT

A phase-controlled power supply is disclosed. The power supply includes a power conditioner with an input configured to connect to an external source of electrical power, the power conditioner being configured to provide conditioned power on its output. The power supply also includes a transformer having a primary winding and a secondary winding, and a switching module coupled between the output of the power conditioner and to the primary winding of the transformer. The switching module has two modes of operation and a control signal input configured to accept a first control signal. The switching module includes a switching element configured to connect the power conditioner output to the primary winding of the transformer. The switching module operates in the first mode when the first control signal is in a first state, switching the first switching element at a first frequency and first duty cycle. The switching module operates in the second mode when the first control signal is in a second state, switching the first switching element at a frequency and duty cycle according to the first control signal.

21 Claims, 5 Drawing Sheets

PHASE-CONTROLLED UNINTERRUPTIBLE POWER SUPPLY

BACKGROUND

1. Field

The present disclosure is related generally to power supplies that requires isolation, and more particularly, to uninterruptible power supplies configured to prevent surges and excessive radio frequency interference (RFI) and electromagnetic interference (EMI).

2. Description of the Related Art

The use of electronic and computer systems has expanded immensely and affects almost all ways of life. Such systems have also been adopted for medical use and their presence is ubiquitous. Even brief interruptions of or variations in a main input power supply can cause failures to these systems, resulting in lost time, data, damaged equipment, and high repair bills. To overcome these problems, uninterruptible power supply (UPS) systems have been developed and are well known in the art. These include both on-line and off-line configurations. The simplest type, known as 'single conversion' or 'standby', uses a battery, an inverter to convert the battery voltage to an AC voltage, and a transfer switch that switches the UPS output from the main supply to the inverter output if the main supply voltage is lost. The transfer time from the main power supply to the UPS power supply during the switching can be noticeable and can become a significant problem in some computer applications. A sharply reduced transfer time is desirable.

An alternate type of UPS known as 'double conversion' or 'on-line' eliminates this transfer time. The main AC supply voltage is continuously converted by a rectifier to a DC voltage and charges a battery that is in parallel with the DC voltage. This DC voltage is converted by an inverter back to an AC output voltage. If the AC supply voltage is lost, the battery supplies the DC voltage to the inverter immediately and there is no interruption in power to the load. Upon the return of the main AC supply voltage, the load is again supplied by the main AC power supply without any interruption in power. Since the incoming power is rectified, incoming power is inherently conditioned since surges, sags, and noise can be essentially eliminated during the conversion to DC.

Many types of on-line UPS systems have been developed including a three port transformer having a first primary winding connected to an AC input, a second primary winding connected to a battery-inverter arrangement, and the secondary winding connected to the load. A series regulator is used to keep the output voltage within certain limits when the main AC supply input is present. A synchronization circuit provides a means of having the AC output of the inverter in phase with the AC input when a transfer takes place to prevent large voltage transients. Phase lock loops (PLL) have been commonly used as a means for locking one frequency to another to provide line synchronization and are commercially available as integrated circuit packages, such as a Harris Semiconductor type CD4046B. Another UPS system adaptable for use with alternate energy supplies requires an input supply of given frequency and amplitude. A DC bus is established that is fed from either rectified AC input power or batteries. The DC bus voltage is converted back to an AC output voltage. Various configurations using different combinations of AC/DC, DC/AC, DC/DC, and AC/AC converters have been used. Regulation of the AC output is controlled by keeping the DC bus at a predetermined voltage level. Energy transfer into the bus is controlled by adjusting the magnitude and phase relationship of the AC input voltage and the AC side of an AC/DC converter feeding this bus.

These and other known types of UPS devices have various operational characteristics and features that are unique to the method employed and would be difficult to integrate into a single, cost-effective device. Features desired for a UPS system include high efficiency in the normal mode of operation, small size, reliability of components, regulation of the AC output voltage during both on-line and standby modes of operation, fast transfer times between modes with low electrical noise generation, extended battery life, line isolation between supply and load, elimination of voltage spikes to the load and the device during transfer times, and diagnostic capabilities.

A microprocessor-based UPS device allows the integration of these features wherein the microprocessor reduces the need for extensive hardware, with a reduction in power requirements, without compromising performance while increasing the overall efficiency of the UPS device. However, most output inverter stages employed in UPS systems compare the voltage output with a desired output in an error amplifier to produce an error signal proportional to the error. The error signal is then applied to the input of a pulse width modulator (PWM) operating at a frequency much higher than the output frequency. The width of the output pulse is modulated with respect to the error signal and applied to a switching type amplifier. The output is filtered by an inductor to remove the high frequency components caused by the switching mode of operation. This may cause a problem in system frequency response and stability since the inductor introduces a pole in the system transfer function. To overcome this problem, an inner current feedback control loop is introduced to the voltage feedback to effectively eliminate the output inductor. These types of feedback systems utilize peak current mode control. This control requires slope compensation in the circuitry and requires compensation for peak to average current errors. To improve on this drawback, a current feedback system that relies on average current rather than peak current is desired. These types of control systems have been commonly developed for DC amplifiers but do not exist for AC systems.

Another concern commonly associated with UPS systems is providing adequate protection for the solid state output devices to prevent failures due to overloads, short circuits, and overheating. Some current power supplies control the power conversion across the transformers with independent analog loops. Because they are independent, the relative phase between the loops is not controlled. If two transformers are turned on simultaneously and are in phase, a current spike will be produced that is much larger than desired. Controlling the transformers so that they are out of phase is desirable.

Many UPSs will not start up without charged batteries installed and on line, since the control circuits are powered solely by the batteries. Although this is a valuable feature in some applications, this imposes a severe limit on usefulness when the batteries are uncharged but are present and can be charged while the UPS is being used.

Similarly, many UPSs will not start up on battery power, even when the batteries are fully charged, when there is no AC input power available. This imposes a limitation on the operation of equipment connected to the UPS after AC power has been lost, which is when a UPS would be of the greatest benefit.

SUMMARY

There is a need for an uninterruptible power supply that provides medical-grade isolation, utilizes a high-voltage internal DC bus for supporting a wide range of circuits, provides a smooth transition to battery power when necessary, and includes phase alignment of internal switching circuits to avoid large voltage or current transients. A need also exists for a UPS that can be started without the presence of charged batteries as well as solely from batteries in a stand-alone mode.

Briefly and in general terms, the present disclosure is directed to systems and methods for a microprocessor-based uninterruptible power supply or "UPS" that supplies electrical power from a secondary source upon a loss of the AC input power.

In certain aspects of the present disclosure, a phase-controlled power supply comprises a power conditioner configured to provide a DC power output, a transformer comprising a primary winding and a secondary winding; and a first power converter. The power conditioner comprises an input configured to connect to an external source of electrical power. The first power converter is coupled to the output of the power conditioner and to the primary winding of the transformer and configured to accept a first external control signal. The first power conditioner comprises a first switching element having a first switching frequency, a first switching phase, and a first switching duty cycle. The first switching element is configured to control the flow of current from the power conditioner through the primary winding of the transformer. The power conditioner further comprises a switch control circuit that is coupled to the first switching element. The switch control circuit is configured to accept the first external control signal. The frequency, phase, and duty cycle of the first switching element are controlled by the first external control signal when the signal is present. The frequency, phase, and duty cycle of the first switching element are controlled by internal elements of the first switch control circuit when the signal is not present.

In certain aspects of the present disclosure, a phase-controlled UPS comprises a power conditioner having an input configured to connect to an external source of electrical power, wherein the power conditioner is configured to provide a DC power output, a DC power bus coupled to the output of the power conditioner, a power output module having an input coupled to the DC bus with a minimum input voltage, wherein the power output module is configured to create an output of a specified voltage and frequency, a battery whose voltage is less than the voltage of the DC power output of the first power conditioner, and a power converter having an input coupled to the battery and an output coupled to the DC power bus, configured to draw power from the battery and create a DC voltage on the output that is less than the voltage of the DC power output of the power conditioner and greater than the minimum input voltage of the power output module.

In certain aspects of the present disclosure, a phase-controlled UPS capable of starting up and operating without a battery or without an external source of electrical power is disclosed. The phase-controlled UPS comprises a power conditioner configured to be connected to the battery and to an external source of electrical power, further configured to create a first power output of a specified voltage and frequency and a second power output having a DC voltage. The phase-controlled UPS further comprises a battery having a voltage less than the DC voltage of the second power output of the power conditioner, the battery being coupled to the power conditioner. The phase-controlled UPS further comprises a controller, coupled to the power conditioner and configured to control the operation of the power conditioner, and further configured to initialize and operate upon the application of operational power. The phase-controlled UPS further comprises a power regulator with an input and an output, the input having a specified range of acceptable voltage wherein the battery voltage and the second power output are both within the acceptable range, the output configured to supply operational power to the controller. The regulator is configured to provide output power whenever the input is connected to a source having a voltage within the acceptable range. A battery switch is coupled to the battery and the power regulator input, and configured to couple the battery to the power regulator input when the switch is closed. The second output of the power conditioner is coupled to the input of the power regulator. The power conditioner is configured to provide the second output when connected to an external source of electrical power regardless of whether the controller is operating. The power regulator will draw power from the second output of the power conditioner when the UPS is connected to an external source of electrical power; and wherein the power regulator will draw power from the battery when the UPS is not connected to an external source of electrical power and the battery switch is closed.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION OF THE DRAWINGS

A design of a computer-controlled power supply is described according to certain aspects of the present disclosure. Certain elements of the power supply can be implemented separately or in conjunction with other elements, depending on the desired capabilities of the power supply.

In the following detailed description, numerous specific details are set forth to provide a full understanding of the present disclosure. It will be apparent, however, to one ordinarily skilled in the art that embodiments of the present disclosure may be practiced without some of the specific details.

In other instances, well-known structures and techniques have not been shown in detail so as not to obscure the disclosure.

Figure 1:
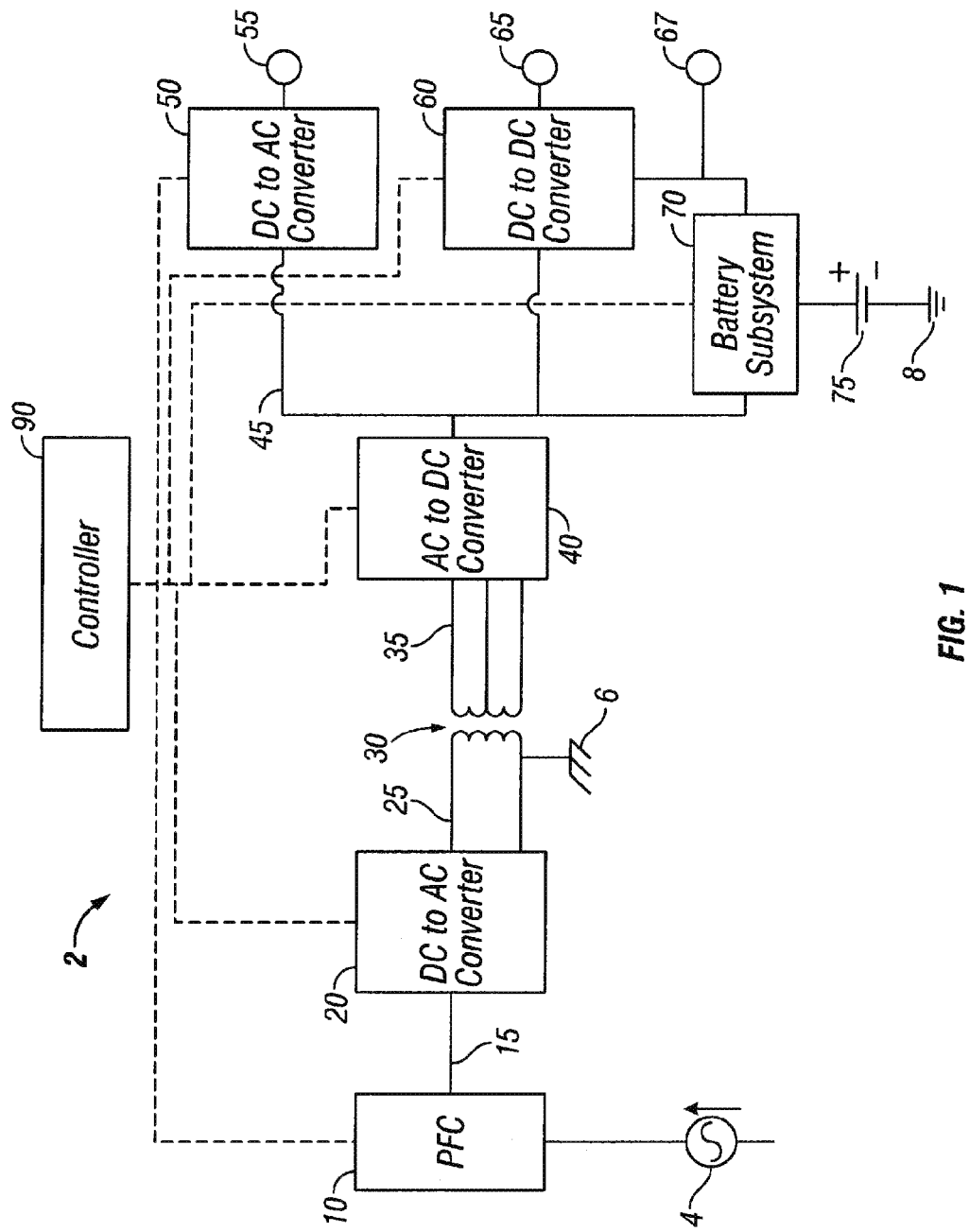
FIG. 1 is a block diagram of a computer-controlled UPS according to certain embodiments of the subject disclosure.

FIG. 1 depicts a block diagram of a computer-controlled power supply 2 according to certain embodiments of the subject disclosure. Input power 4 is, for this example, AC power within the range 90-250 VAC at a frequency in the range 50-60 Hz which covers the majority of power available worldwide. This power is fed to power factor controller (PFC) 10 that produces a 400 VDC output on bus 15 while maintaining the power factor for input 4 at a high number, typically 0.9 or higher. Bus 15 connects to a DC-to-AC converter 20. Converter 20 is a switching power controller that creates 400 VAC output on bus 25 that is connected to the primary winding of medical-grade isolation transformer 30. The secondary winding is connected to 400 VAC bus 35 that is connected to AC-to-DC converter 40. Converter 40 produces a +/−200 VDC output on bus 45. Bus 45 provides power to, in this example, converters 50 and 60 and battery system 70. DC-to-AC converter 50 provides a 120 VAC output on terminal 55. DC-to-DC converter 60 provides 36 VDC on terminal 65 and 24 VDC on terminal 67. In other embodiments, either of these converters may be omitted and other converters producing other AC or DC voltages may be added. The interaction of battery subsystem 70 with bus 45 is discussed in detail in FIG. 3. Battery 75 is shown separate and connected to battery subsystem 70. Controller 90 is connected to all of the other functional blocks except transformer 30, which is not an active device.

PFC 10 is an active power factor corrector of a configuration known to those of skill in the art. PFC 10 will provide an output at, in this example, a constant 400 VDC bus voltage on bus 15 while drawing a current from power input 4 that is always in phase with and at the same frequency as the voltage of input 4. The use of a power factor corrector isolates the downstream electronics from fluctuations and noise on power input 4 in addition to the reduction of noise introduced to the power source of input 4.

DC-to-AC converter 20 switches the 400 VDC of bus 15 in alternating directions to create a 400V square wave on bus 25. While not the usual sinusoidal wave shape associated with AC power, this is an efficient wave form for a transformer. Upon initial power-up, converter 20 starts running the switches at a predetermined frequency that is, in this example, 120 kHz, and runs without a feedback loop. This is sufficient to provide power across transformer 30 which will power-up the circuits on the secondary side of transformer 30 that includes controller 90. After controller 90 initializes, it assumes control of the frequency and phase of the square wave on bus 25. This operation is discussed more fully in FIGS. 2 and 4.

"Medical grade" power supplies, sometimes referred to as "hospital grade", have met the construction requirements of a regulatory standard such as UL 60601-1, IEC 60601-1, CSA C22.2 No. 601 or EN 60601-1. The transformer is usually the component that provides the capabilities to meet the regulatory requirements. The medical-grade isolation transformer 30 is of standard construction familiar to those of ordinary skill in the art. Transformer 30 has a single center-tapped secondary winding at a 1:1 ratio with the primary winding so that the voltage of the output waveform on bus 35 is nominally the same as on bus 25. Running at a frequency, in this example, of 120 kHz with a 1:1 ratio enables transformer 30 to be smaller and less expensive than it would be if it were running at 60 Hz as is commonly done or had a higher coupling ratio. While medical grade isolation is not necessary in many applications, some kind of transformer may be required to convert the ground-referenced 400 VDC of bus 15 to the +/−200 VDC of bus 45 in this topology and the incremental cost of providing the medical grade isolation is minimal.

AC-to-DC converter 40 generates +200VDC and −200VDC on bus 45 that is referenced to signal ground 8, which is isolated from the earth ground 6 on the primary side of transformer 30. Feedback of the voltage on bus 45 through the linkages from converter 40 to controller 90 and control signals from controller 90 to converter 20 adjusts the duty cycle of the switching to maintain the voltages on bus 45.

DC-to-AC converter 50 is a switching converter that, in this example, creates a single-phase 120 VAC 60 Hz sinusoidal waveform on terminal 55 from the +200 VDC and −200 VDC lines of bus 45 using pulse width modulation (PWM). The switching frequency, in this example, is the same as the switching frequency of converter 20. The switching of converter 50 is controlled by controller 90 to be synchronized in frequency while being phase shifted with respect to converter 20 to minimize noise and current spikes. Switching at 120 kHz enables a precise control of the waveform to be a true sinusoid. Alternate embodiments may include outputs at 240 VAC or 50 Hz.

DC-to-DC converter 60 is similar to converter 50 in that it uses PWM to create, in this example, 36 VDC and 24 VDC voltages from the +/−200 VDC bus 45. In this example, the two voltages are produced from dual secondary windings on a common transformer with the 24 VDC being the reference for feedback to controller 90 which controls the switching of converter 60. This provides tight control of the 24 VDC on terminal 67. In this example, the 36 VDC on terminal 65 is not critical and can be allowed to vary several volts up or down without impact to the components that use this voltage. If it is critical to provide tight control of the 36 VDC on terminal 65, a second DC-to-DC converter could be added, in certain embodiments, in parallel to converter 60 to independently create the 36 VDC.

One advantage of the topology of FIG. 1 is that the functional blocks operate independently, which facilitates the design, testing, and troubleshooting of the power supply. For example, the battery subsystem 70 can be removed from the design without impact to other functional blocks. Similarly, a third output converter could be added to the power supply as long as the power capacity of the upstream PFC 10, converters 20 and 40, and transformer 30 are adequate to handle the increased load.

Figure 2:
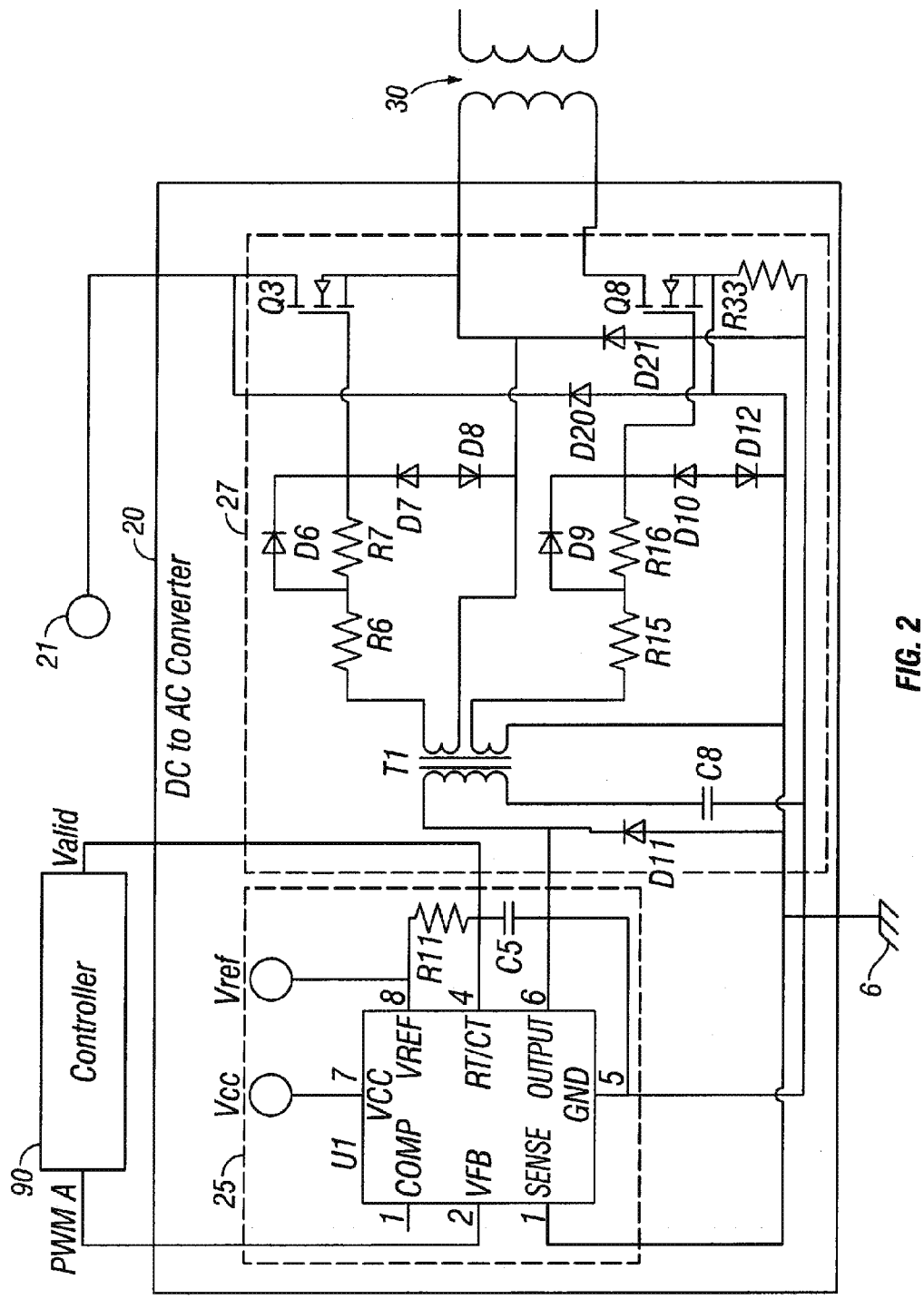
FIG. 2 is a schematic of a power-switching control circuit that is part of the UPS of FIG. 1 according to certain embodiments of the subject disclosure.

FIG. 2 is a schematic of a power-switching control circuit that is part of FIG. 1 according to certain embodiments of the subject disclosure. Transformer 30, controller 90, and earth ground 6 are common to both FIGS. 1 and 2. The voltage on bus 15 in FIG. 1 is equivalent to the +400 VDC input 21 in FIG. 2. The DC-to-AC converter 20 of FIG. 1 is expanded here to shown internal modules. Controller 25 contains U1, R11, and C5 while switching element 27 contains the remaining components that collectively switch the current through the primary winding of transformer 30.

The following component values and part numbers illustrate certain embodiments of the disclosed circuit. Transistors Q3 and Q8 connect the primary winding of transformer 30 to the +400 VDC and ground lines. Q3 and Q8 are both N-channel MOSFET transistors such as an IRF840. Q3 and Q8 are turned on and off together by two parallel secondary windings of a gate transformer T1. Diodes D20 and D21 are ultrafast recovery rectifiers with low leakage and low forward voltage drop, such as a UF3005. Diodes D6, D8, D9, and D12 are high-speed switching diodes such as 1N914B. Diodes D7 and D10 are Zener diodes with a Zener voltage of 18 V such as 1N5931B. Resistors R6 and R15 are 51 ohms and R7 and R16 are 82 ohms. R33 is a 2 ohm, 5 watt resistor used as a current sensor. U1 is a current mode PWM controller such as a UC3844. C5 is 1000 pF and R5 is in the range of 5-10 kohms and together control the open-loop oscillation frequency when connected to U1 as shown, with the value of R5 selected to provide the desired frequency. For the example U1 device UC3844, the frequency is approximately equal to 1.72/(R5*C5). D11 is a Schottky diode such as 1N5819HW and C8 is a 1 μF capacitor. Other filtering capacitors and resistors recommended for use with the specific device of U1 have been omitted so as not to obscure the disclosure. The control signals from controller 90 have been expanded to show two lines—'PWM A' and 'valid' signals.

Upon initial power-up, controller 90 is inactive and both the lines 'PWM A' and 'valid' are, in this example, low. U1 will start up in an open-loop mode with its output 5 oscillating at the frequency determined by R5 and C5, which will be approximately 120 kHz at a fixed duty cycle selected to generate sufficient power on the secondary of transformer 30 to bring up the rest of the electronics. U1 drives gate transformer T1, which drives the switching transistors Q3 and Q8.

After controller 90 initializes, it brings the control signals to a second state wherein the 'valid' line is high and controller 90 provides a pulse string on 'PWM A' that represents the on/off cycling for Q3 and Q8. When the 'valid' line goes high, U1 switches from the open-loop mode to a closed-loop mode, where its output 5 is switched according to the pulse string on 'PWM A.' Controller 90 then adjusts the timing and pulse width of the 'PWM A' signal based on feedback from converter 40. This ability of the DC-to-AC converter 20 to start up in a stand-alone open-loop mode and create a square wave that drives the rest of the circuitry through transformer 30 and then convert to an externally controlled closed-loop mode of operation, enabling feedback control of the frequency and phase of the switching, is an advance on the capabilities of current power supplies.

Figure 3:
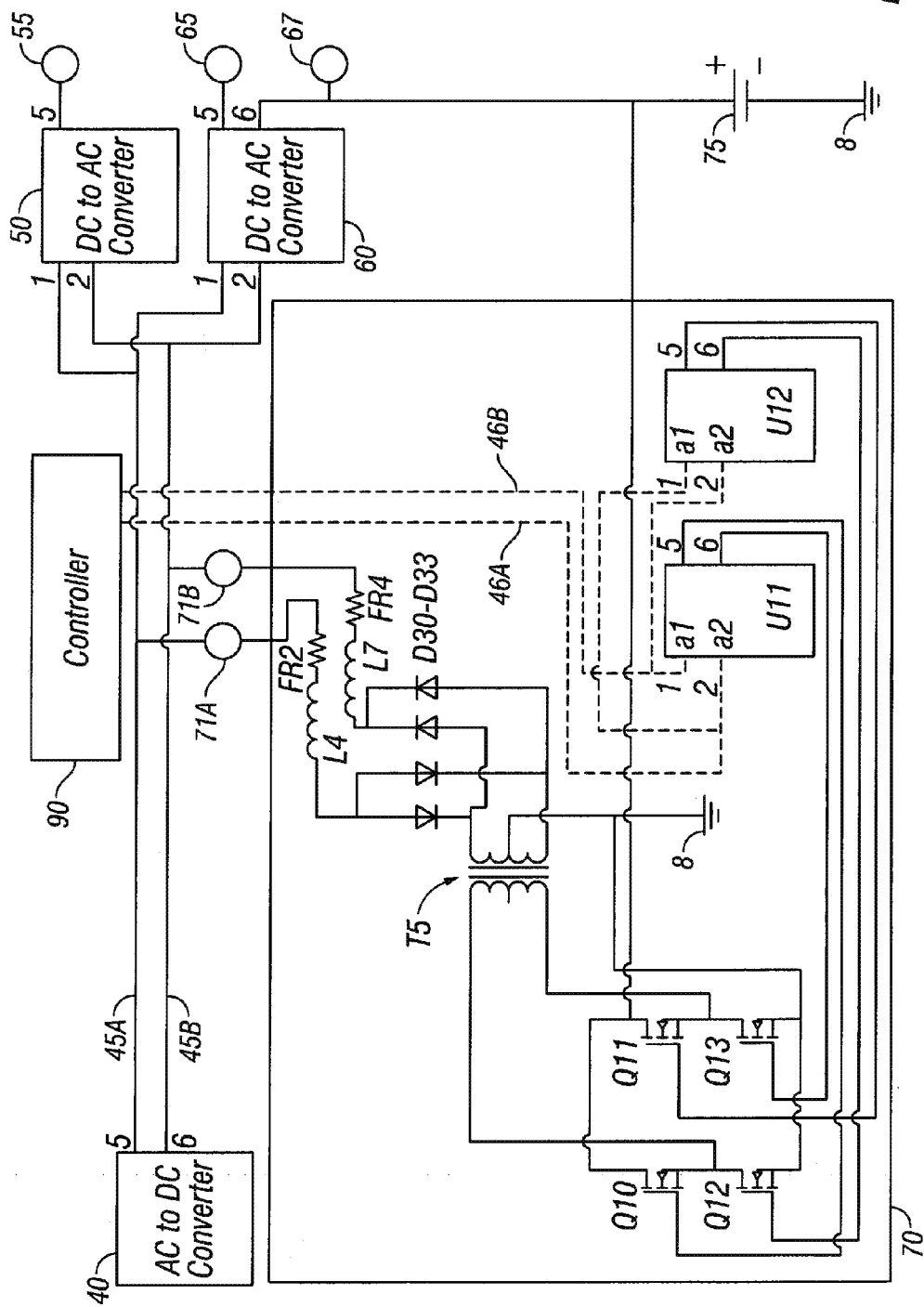
FIG. 3 is a schematic of the battery subsystem of FIG. 1 according to certain embodiments of the subject disclosure.

FIG. 3 is a schematic of the battery subsystem of FIG. 1 according to certain embodiments of the subject disclosure. Converters 40, 50, and 60, battery 75, earth ground 6 and signal ground 8, controller 90, and terminals 55, 65, and 67 are repeated from FIG. 1. The +/−200 VDC bus 45 has been expanded to show the two lines as +200 VDC line 45A and −200 VDC line 45B, to which are attached terminals 71A and 71B, respectively. The control signals from controller 90 has been expanded to show the HI and LO signals, 46A and 46B respectively, that drive the circuitry. The remaining circuitry is part of battery subsystem 70.

In the example shown in FIG. 3, transistors Q10, Q11, Q12, and Q13 are switched in pairs to create a square wave on the primary side of transformer T5. The secondary winding on T5 is center-tapped with a ratio that will bring the 24 VDC input to approximately 400 VDC. The output of T5 is rectified and filtered to provide DC voltages on terminals 71A and 71B.

Devices U11 and U12 are high and low side drivers such as IR21814. U11 controls Q10 and Q13 while U12 controls Q11 and Q12. The drive signals 46A and 46B from controller 90 are connected to opposite inputs on the U11 and U12 such that when the differential voltage across terminals a1 and a2 of U11 is positive, the voltage differential across a1 and a2 of U12 is negative. This will cause Q10 and Q13 to be on while Q11 and Q12 are off, causing current to flow from the 24 VDC line through Q10 through the primary winding of T5 and then through Q13 to ground. When the signals 46A and 46B reverse, Q11 and Q12 conduct while Q10 and Q13 are off and current flows from the 24 VDC line through Q11 through the primary winding of T5 in the opposite direction as the previous configuration and then through Q12 to ground. Transistors Q10-Q13 are all N-Channel MOSFET transistors with ultralow on-resistance such as IRLZ44N. Diodes D30-D33 are all ultrafast recovery rectifiers such as UF3005. The outputs are filtered by inductors L4 and L7, which have values of 1.8 mH, and resistors FR2 and FR4, which have values of 10 ohms. Other filtering capacitors, resistors, and diodes recommended for use with the specific device of U11 and U12 have been omitted so as not to obscure the disclosure.

In operation, controller 90 monitors the voltages on 71A and 71B (feedback linkage is not shown) and adjusts the duty cycle of Q10-13 such that the voltages on 71A and 71B, relative to the center-tapped ground 6, are +195 VDC and −195 VDC, respectively. Having these voltages at levels just below the normal operating voltages of +200 VDC and −200 VDC is key to the improvement offered by this circuit design.

While there is power available on input 4, controller 90 adjusts converter 20 to maintain the output of converter 40 on busses 45A and 45B at +200 VDC and −200 VDC, respectively. As the set-points for the control loop in controller 90 for the voltages on 71A and 71B are +195 VDC and −195 VDC, the control loop is active with a duty cycle of zero. Since the control loop is active, however, this condition is monitored at the speed of the control loop, which may be several kHz. If input power 4 is lost, the voltage produced by converter 40 starts to drop. When the voltage on 45A and 45B reach +195 VDC and −195 VDC, respectively, the control loop for battery subsystem 70 starts to increase the duty cycle of transistors Q10-Q13 from zero to maintain the voltage at its setpoint. As the battery subsystem control loop is running, in this example, at kHz speed, the response of the system is much faster than the 60 Hz frequency of the output of converter 50 and the transition from input power 4 to battery 75 will not affect the operation of converter 50 or the quality of the waveform on output terminal 55. As the power output of converter 40 continues to fall to zero, the voltages on 45A and 45B are maintained at +195 VDC and −195 VDC by battery subsystem 70 drawing power from battery 75. This will continue until either battery 75 are exhausted or power input 4 is restored.

Having the control loop for battery backup running in the background while operating from input power 4 provides a seamless transition from input power to battery power. The continual feed of a PWM pulse stream with a zero duty cycle enables the use of switching transistors Q10-13 in conjunction with a boost transformer T5 to enable the internal DC power bus 45 to run at a higher voltage than the voltage of battery 75, improving the efficiency of the subsequent output converters 50 and 60. The use of high frequency switching, 120 kHz in this example, for the transistors Q10-Q13 enables the use of a smaller and less expensive transformer T5.

Figure 4:
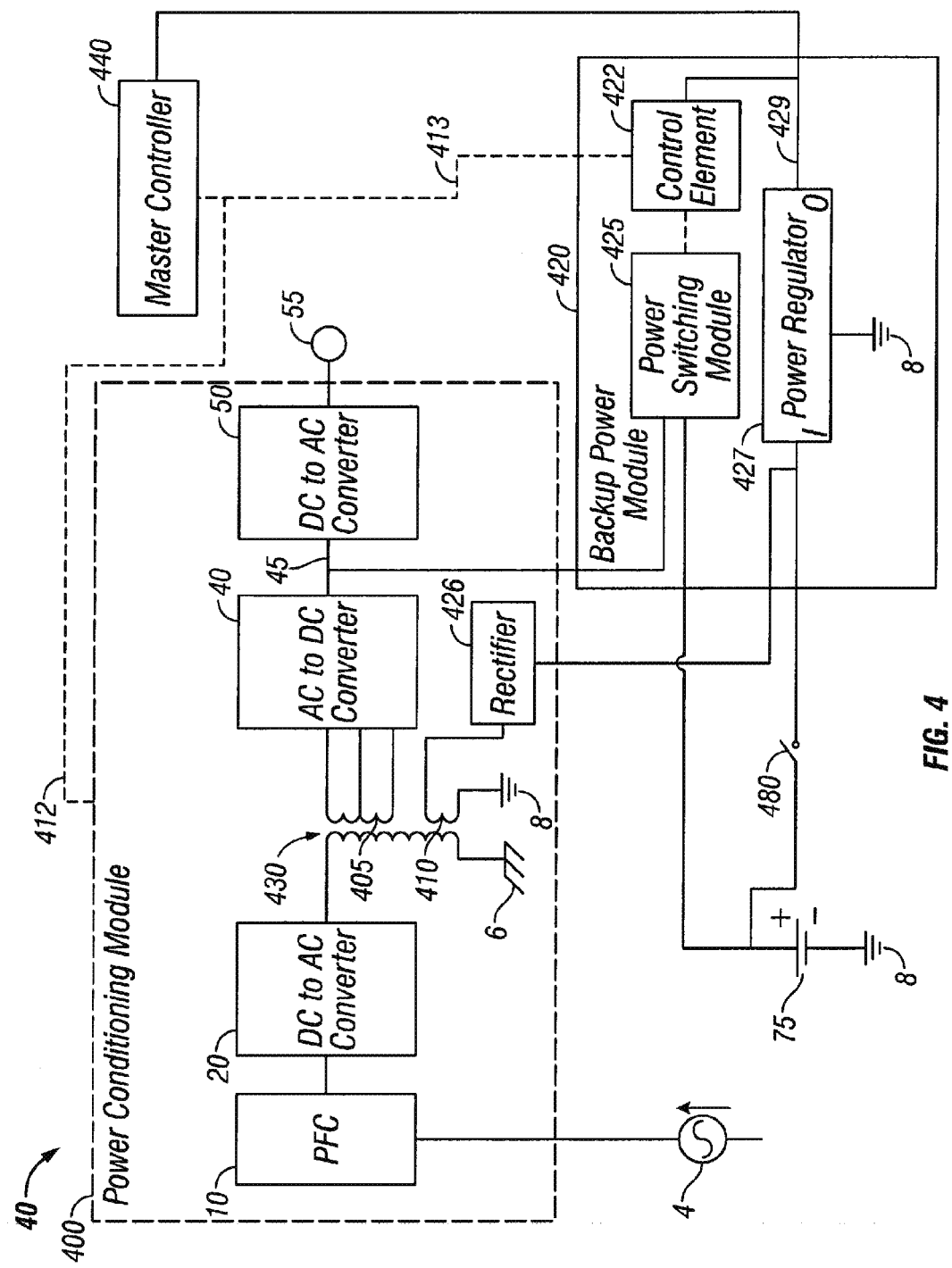
FIG. 4 is a partial block diagram of the UPS of FIG. 1 that shows start-up capabilities according to certain embodiments of the subject disclosure.

FIG. 4 is a block diagram 40 of the UPS of FIG. 1 and will be referred to in describing start-up capabilities according to certain embodiments of the subject disclosure. PFC 10, converters 20, 40, and 50 are shown as elements of power conditioning module 400. Transformer 30 is shown as transformer 430 configured with a second secondary winding. Battery subsystem 70 of FIG. 1 is shown as backup power module 420 configured to provide additional start-up capabilities. Controller 90 from FIG. 1 is shown as master controller 440 to distinguish it from the controller of the backup power module 420. AC input power source 4, battery 75, grounds 6 and 8, and output 55 are as in FIG. 1. Converter 60 and outputs 65 and 67 from FIG. 1 have been omitted from FIG. 4 for clarity.

Power conditioning module 400 contains the elements of the computer-controlled UPS that operate as described with respect to FIG. 1 to generate, in this example, 120 VAC at 60 Hz at output 55. The method that the computer uses to generate the voltage wave form at output 55 from DC bus 45 is described in FIG. 5. Master controller 440 receives feedback signals from and sends control signals to all the elements of module 400 through connection 412. Transformer 430 has a secondary winding 405 at a 1:1 ratio to the primary winding, analogous to the winding of transformer 30 in FIG. 1, which is connected to AC-to-DC converter 40. Transformer 430 also has a secondary winding 410 that is discussed in more detail below. Rectifier 426 is an AC-to-DC converter that functions without external control.

Backup power module 420 contains a power switching module 425 that includes the switches, transformer, and other components required to convert the voltage of battery 75 to a desired voltage that is fed onto DC bus 45 as described relative to FIG. 3. Control element 422 controls the operation of module 425 and is further controlled by master controller 440 over link 413. Power regulator 427 functions without external control and generates a voltage on output line 429 that is connected to and within the power input range of, among other devices, control element 422 and master controller 440.

The UPS will start up solely on battery power in the absence of external power on input 4 when switch 480 is closed. Switch 480 connects the output of battery 75 to the input of power regulator 427. When switch 480 is closed, power regulator 427 will draw power from the battery 75 and generate voltage on line 429 without further external command. The presence of voltage on line 429 will power up control element 422 and master controller 440. Master controller 440 will command control element 422 over link 413 to start operating the power switching module 425 to generate the appropriate output voltage, discussed previously for FIG. 3, which feeds the DC bus 45 connected to DC-to-AC converter 50 which then generates output 55. The UPS will continue to operate in this mode until either battery 75 is exhausted or power is available on input 4. When power becomes available on input 4, converters 20 and 40 will start up and generate a higher voltage on DC bus 45, as discussed previously for FIG. 3, which will cease drawing power from module 420.

The UPS will start up from external power on input 4 in the absence of battery 75 by drawing power through secondary winding 410. As previously described for FIG. 1, PFC 10 and converter 20 will operate in an open-loop mode without external control when power is initially supplied. Converter 20 drives a square wave through the primary coil of transformer 430 which creates an output voltage on secondary winding 410. Secondary winding 410 is connected to the input of rectifier 426 whose output is connected to the input of power regulator 427. Winding 410 has a ratio such that the output voltage of rectifier 426 is more than the voltage of battery 75 and within the input range of power regulator 427 such that power will always be drawn from rectifier 426 even if switch 480 is closed. In this example, the battery voltage is 24 VDC, the voltage on the primary winding of transformer 430 is 400 VAC, and the winding ratio of secondary winding 410 is 15:1 delivering a square wave to rectifier 426 such that the voltage of the output of rectifier 426 is approximately 28 VDC. Upon the application of this power to the input of power regulator 427, regulator 427 will draw power from input 4 through secondary winding 410 and rectifier 426 and generate voltage on line 429 without further external command. The presence of voltage on line 429 will power up master controller 440 that, as described previously for the start-up mode, will take over control of converter 20 and start AC-to-DC converter 40 and DC-to-AC converter 50, which will generate output 55. The backup power feature is not available in this mode as no battery is attached to provide an alternate source of power but the system will function as it would otherwise while external power is available on input 4.

Figure 5:
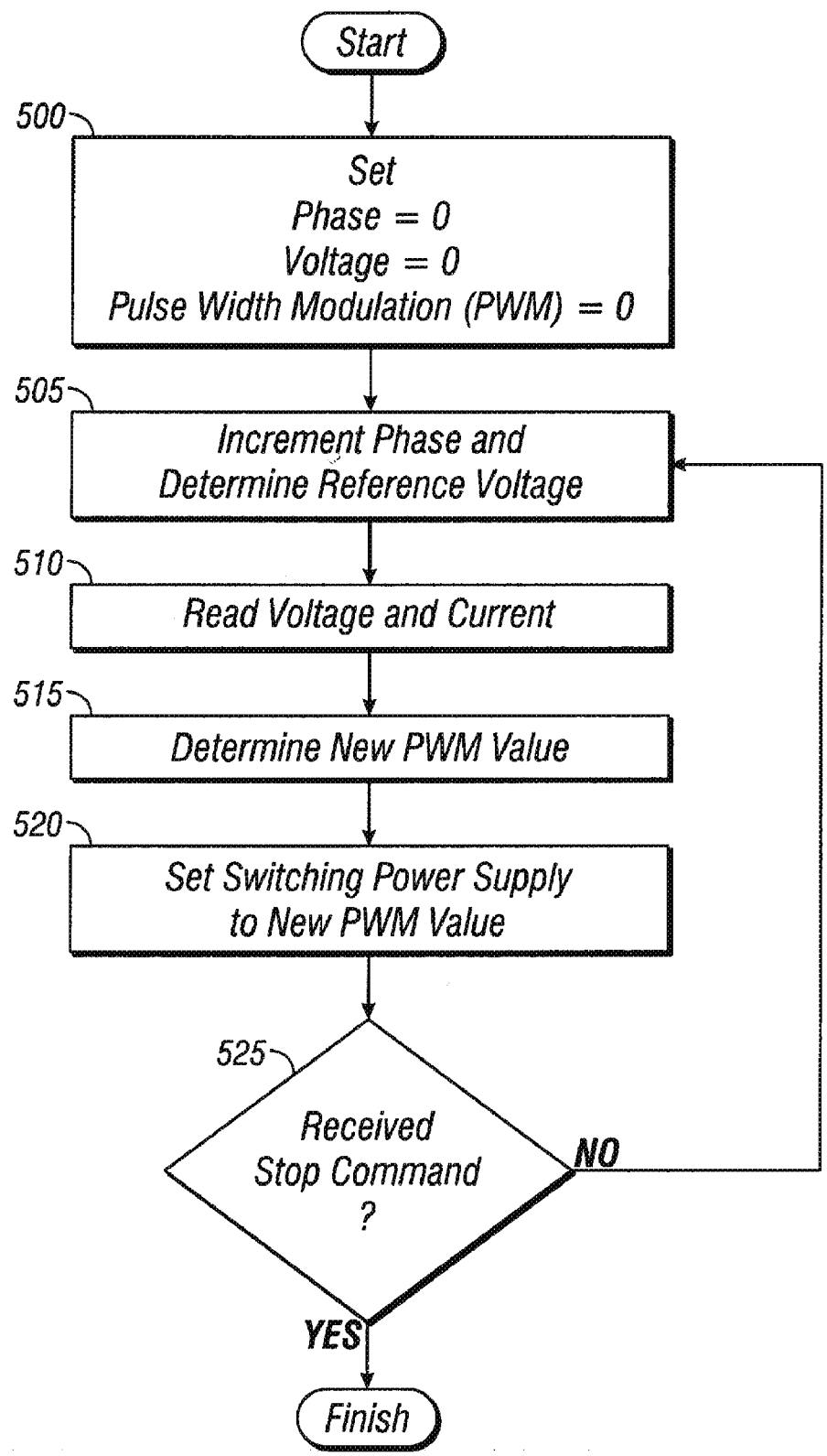
FIG. 5 is a flow chart that describes how the controller 90 of FIG. 1 controls the DC-to-AC converter 50 to generate, in this example, 120 VAC at 60 Hz according to certain embodiments.

FIG. 5 is a flow chart that describes how the controller 90 of FIG. 1 controls the DC-to-AC converter 50 to generate, in this example, 120 VAC at 60 Hz according to certain embodiments. Converter 50 comprises a pulse-width-modulated (PWM) switching power supply operating at a frequency well above the frequency of the output. In the example of FIG. 5, the switching frequency is 120 kHz. A control circuit measures the voltage and current of the output of the PWM power supply and controls the width of the "on" pulse for each cycle at the switching frequency. Starting at step 500, the system is initialized for a sine wave where voltage is zero, the phase angle is zero, and the PWM=0. In step 505, the control circuit determines a reference voltage for an ideal sine wave at the incremental phase angle. This may be accomplished through a look-up table or calculated each time. The control circuit measures the actual output voltage and current in step 510 and, in step 515, calculates a new value for the pulse width modulation. This calculation may be accomplished by comparison of the actual voltage and current to the ideal current using a proportional-differential-integral (PID) control loop or digital control algorithm according to feedback control law design principals well known to those of ordinary skill in the art. This new value is loaded into the control loop in step 520. In the absence of a "Stop" command, the process branches at step 525 back to step 505 and repeats the process. Programming according to this method, for this and other voltages and frequencies, is readily accomplished by those of ordinary skill in the art given the method steps and description provided.

It should be borne in mind that various details have been left out of the description since they are well known to those skilled in the art. For example, EMI and RFI filters may be used but have not been described since their use is common in power circuits. Also, the system may employ bridge rectifiers and power diodes that are not described herein since their operation is well known to those of skill in the art. Switches for controlling the power supply to on and off configurations are also shown but not described due to their commonplace nature. Various ways of implementing power conversion are possible. The particular embodiment shown here is not meant to be limiting.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

Elements and functions of the functional blocks may be moved to other blocks or separated into individual blocks and blocks may be consolidated within the scope of this disclosure. Disclosed features may be deleted from the system and elements of the system may be used independently. The examples provided herein are intended to explain the concepts and not to be interpreted as limiting the configurations in which these concepts may be implemented.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The term 'battery' is intended to encompass all energy storage devices which deliver electricity. These energy storage devices may be rechargeable or single-use. This includes but is not limited to batteries using lead-acid, zinc-carbon, alkaline, nickel cadmium, lithium, and lithium-ion technologies, capacitors, generators powered by springs or compressed gas or other mechanical energy storage mechanisms, and fuel cells.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A phase-controlled power supply, comprising:
   a power conditioner with an input and an output, the input configured to connect to an external source of electrical power, wherein the power conditioner is configured to provide conditioned power on its output;
   a transformer comprising a primary winding and a secondary winding; and
   a switching module coupled between the output of the power conditioner and the primary winding of the transformer, the switching module having open-loop and closed-loop modes of operation, the switching module comprising:
      a first switching element configured to connect the power conditioner output to the primary winding of the transformer; and
      a control signal input configured to accept a first control signal;
   wherein the switching module operates in the open-loop mode when the first control signal is in a first state, the open-loop mode comprising switching of the first switching element at a open-loop frequency and a open-loop duty cycle, and
   wherein the switching module operates in the closed-loop mode when the first control signal is in a second state, the closed-loop mode comprising switching of the first switching element at a closed-loop frequency and a closed-loop duty cycle according to the first control signal.

2. The phase-controlled power supply of claim 1 further comprising a controller, configured to provide the first control signal; wherein the first control signal is in its first state when the controller is not operational, and wherein the controller changes the first control signal from its first state to its second state upon completion of the controller's power-up and initialization.

3. The phase-controlled power supply of claim 2 further comprising a power converter having an input and an output, the input coupled to the secondary winding of the transformer, wherein the power converter is configured to provide a specified voltage and frequency on its output.

4. The phase-controlled power supply of claim 3 wherein the power converter comprises a second switching element and a control signal input configured to accept a second control signal, wherein the power converter switches the second switching element at a controlled frequency and a controlled duty cycle according to the second control signal, and wherein the controller is further configured to provide the second control signal.

5. The phase-controlled power supply of claim 4 wherein the switching of the first switching element, when controlled by the first control signal, and the switching of the second switching element have substantially the same frequency.

6. The phase-controlled power supply of claim 5 wherein the switching of the first switching element, when controlled by the first control signal, and the switching of the second switching element have a selected phase relationship to each other.

7. The phase-controlled power supply of claim 6 wherein the controller is configured to control the switching frequencies, duty cycles, and phase relationship of the first and second switching elements via the first and second control signals to minimize current and voltage variations on the circuits of the power supply.

8. The phase-controlled power supply of claim 1 wherein the transformer comprises a medical-grade isolation transformer.

9. The phase-controlled power supply of claim 1 wherein the power conditioner comprises a power-factor controller.

10. The phase-controlled power supply of claim 3 wherein the power converter comprises an AC-to-DC converter having an input and an output and a DC-to-output converter having an input and an output, wherein the input of the AC-to-DC converter is coupled to the secondary winding of the transformer, the output of the AC-to-DC converter is coupled to the input of the DC-to-output converter, and the output of the DC-to-output converter is coupled to the power output of the power converter.

11. The phase-controlled power supply of claim 10 wherein the output voltage of the AC-to-DC converter is greater than the voltage of the output of the DC-to-output converter.

12. The phase-controlled power supply of claim 3 wherein the power converter output comprises a DC output.

13. The phase-controlled power supply of claim 3 wherein the power converter output comprises an AC output.

14. A phase-controlled UPS, comprising:
a power conditioner having an input and an output, the input configured to connect to an external source of electrical power, wherein the power conditioner is configured to provide a DC voltage on its output;
a power output module having an input and an output, the input having a minimum input voltage, wherein the power output module is configured to provide a specified voltage at a specified frequency on its output;
a DC power bus coupled between the output of the power conditioner and the input of the power output module;
a battery; and
a power converter having an input coupled to the battery and an output continuously coupled to the DC power bus, wherein the power converter is configured to draw power from the battery and provide a DC voltage on its output that is less than the voltage of the power conditioner output and greater than the minimum input voltage of the power output module.

15. The phase-controlled UPS of claim 14 further comprising a controller coupled to the power conditioner and to the power output module, and wherein the power conditioner and the power output module both comprise one or more switching elements, wherein the controller is configured to control the frequencies, duty cycles, and phase relationship of the switching elements to minimize current and voltage variations on the circuits of the power supply.

16. The phase-controlled UPS of claim 14 wherein the power module comprises a medical-grade isolation transformer.

17. The phase-controlled UPS of claim 14 wherein the power conditioner comprises a power-factor controller.

18. A phase-controlled UPS capable of starting up and operating either without a battery or without an external source of electrical power, comprising:
a power conditioner with an input and at least two outputs, the input configured to connect to an external source of electrical power, wherein the power conditioner is configured to provide a specified voltage and frequency on the first output and a DC voltage on the second output;
a battery having a voltage less than the DC voltage of the second output of the power conditioner, the battery being coupled to the power conditioner and configured to provide power to the power conditioner;
a controller having an input for operational power, coupled to the power conditioner and configured to control the operation of the power conditioner, and further configured to initialize and operate upon the application of power to its operational power input;
a power regulator with an input and an output, the input having a specified range of acceptable voltage wherein the battery voltage and the voltage of the second output of the power conditioner are both within the acceptable range, the output coupled to the operational power input of the controller, wherein the regulator is configured to provide power on its output whenever its input is connected to a power source having a voltage within the acceptable range; and
a battery switch coupled between the battery and the power regulator input, configured to connect the battery to the power regulator input when the switch is closed;
wherein the second output of the power conditioner is coupled to the power regulator input, and the power conditioner is configured to provide the DC voltage on the second output when connected to an external source of electrical power regardless of whether the controller is operating or whether the battery is present or charged;
wherein the power regulator will draw power from the second output of the power conditioner when the UPS is connected to an external source of electrical power; and
wherein the power regulator will draw power from the battery when the UPS is not connected to an external source of electrical power and the battery switch is closed.

19. The phase-controlled UPS of claim 18 wherein the power conditioner comprises two or more switching elements, and wherein the controller is configured to control the frequencies, duty cycles, and phase relationship of the switching elements to minimize current and voltage variations on the circuits of the power supply.

20. The phase-controlled UPS of claim 18 wherein the power conditioner comprises a medical-grade isolation transformer.

21. The phase-controlled UPS of claim 18 wherein the power conditioner comprises a power-factor controller.

* * * * *